US009766658B2

(12) United States Patent
Lee et al.

(10) Patent No.: US 9,766,658 B2
(45) Date of Patent: Sep. 19, 2017

(54) FLEXIBLE DISPLAY DEVICE HAVING GUIDE FUNCTION OF GESTURE COMMAND AND METHOD THEREOF

(71) Applicant: Samsung Display Co., Ltd., Yongin, Gyeonggi-Do (KR)

(72) Inventors: Hyun Jae Lee, Seoul (KR); Joo Seok Yeom, Yongin-si (KR); Sun Mi Yu, Yongin-si (KR)

(73) Assignee: Samsung Display Co., Ltd. (KR)

( * ) Notice: Subject to any disclaimer, the term of this patent is extended or adjusted under 35 U.S.C. 154(b) by 166 days.

(21) Appl. No.: 14/066,345

(22) Filed: Oct. 29, 2013

(65) Prior Publication Data

US 2014/0347287 A1    Nov. 27, 2014

(30) Foreign Application Priority Data

May 27, 2013   (KR) .................. 10-2013-0059710

(51) Int. Cl.
| G06F 3/041 | (2006.01) |
| G06F 1/16 | (2006.01) |
| G06F 3/0488 | (2013.01) |
| G06F 3/0484 | (2013.01) |

(52) U.S. Cl.
CPC ............ G06F 1/1652 (2013.01); G06F 3/041 (2013.01); G06F 3/0416 (2013.01); G06F 3/0484 (2013.01); G06F 3/0488 (2013.01); G06F 2203/04102 (2013.01)

(58) Field of Classification Search
USPC ........................................................ 345/173
See application file for complete search history.

(56) References Cited

U.S. PATENT DOCUMENTS

| 7,109,967 | B2 | 9/2006 | Hioki et al. | |
| 2003/0227441 | A1* | 12/2003 | Hioki et al. | ................... 345/156 |
| 2007/0085845 | A1* | 4/2007 | Kikuchi et al. | ............... 345/204 |
| 2008/0001928 | A1* | 1/2008 | Yoshida | ............. G06F 3/04883 345/173 |
| 2008/0178126 | A1* | 7/2008 | Beeck | ..................... G06F 3/017 715/863 |
| 2009/0085866 | A1* | 4/2009 | Sugahara | ...................... 345/156 |
| 2010/0011291 | A1 | 1/2010 | Nurmi | |
| 2010/0056223 | A1 | 3/2010 | Choi et al. | |
| 2011/0043981 | A1* | 2/2011 | Johnson et al. | ......... 361/679.01 |

(Continued)

FOREIGN PATENT DOCUMENTS

| KR | 10-2010-0050318 A | 5/2010 |
| KR | 10-2012-0102293 A | 9/2012 |

(Continued)

*Primary Examiner* — Jennifer Mehmood
*Assistant Examiner* — Sosina Abebe
(74) *Attorney, Agent, or Firm* — Innovation Counsel LLP

(57) ABSTRACT

Provided is a flexible display device configured to include a touch sensing function and a deformation recognizing function; and a control device configured to control the flexible display panel and including an operating command database, wherein the control device is configured to identify operating command candidates from the operating command database based on at least one of a touch input data and a deformation input data received from the flexible display panel, and to instruct the flexible display panel to display the operating command candidates on the flexible display panel.

21 Claims, 17 Drawing Sheets

(56) References Cited

U.S. PATENT DOCUMENTS

| | | | |
|---|---|---|---|
| 2012/0139834 A1 | 6/2012 | Han et al. | |
| 2012/0329528 A1 | 12/2012 | Song | |
| 2013/0169520 A1* | 7/2013 | Cho et al. | 345/156 |
| 2013/0201093 A1* | 8/2013 | Kim et al. | 345/156 |
| 2013/0300682 A1* | 11/2013 | Choi | H04M 1/0268 |
| | | | 345/173 |

FOREIGN PATENT DOCUMENTS

| | | |
|---|---|---|
| KR | 10-2013-0015542 A | 2/2013 |
| KR | 10-1231106 | 2/2013 |

* cited by examiner

FIG. 4
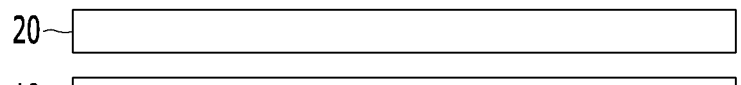
(a)
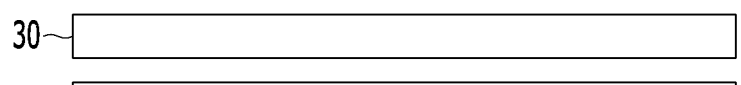
(b)
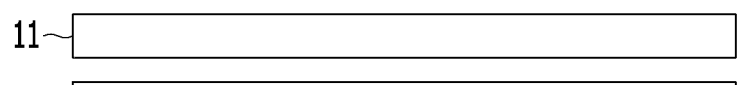
(c)
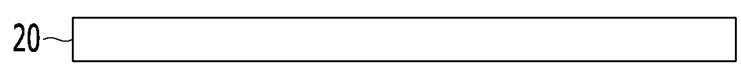
(d)
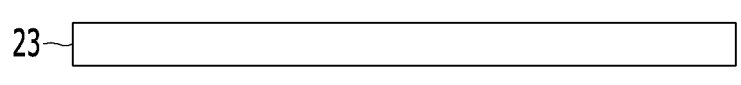
(e)

FIG. 7
| Command | Touch sensor | Deformation recognizing sensor | Strain or angle (Deformed amount) |
|---|---|---|---|
| Next page | 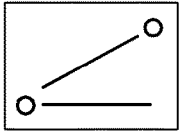 | 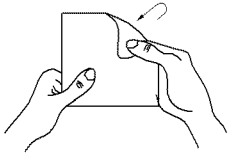 | (1 ~ 3) |
| Previous page | 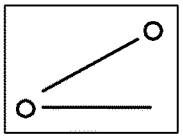 | 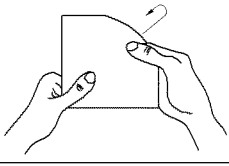 | -(1 ~ 3) |
| Index | 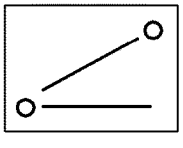 | 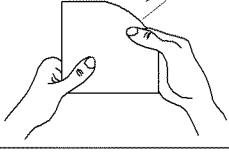 | (6 ~ 10) |
| Zoom In | 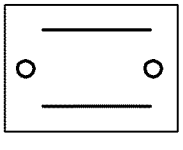 | 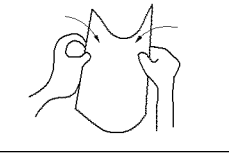 | (5 ~ 10) |
| Zoom Out | 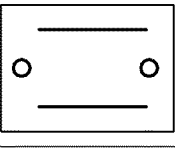 | 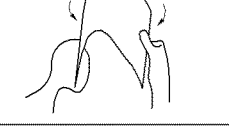 | -(5 ~ 10) |

FIG. 11
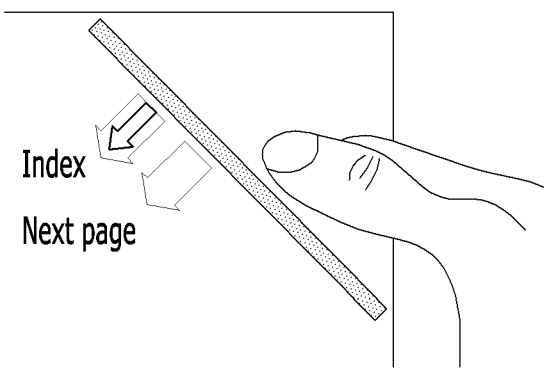
(a) Starting point
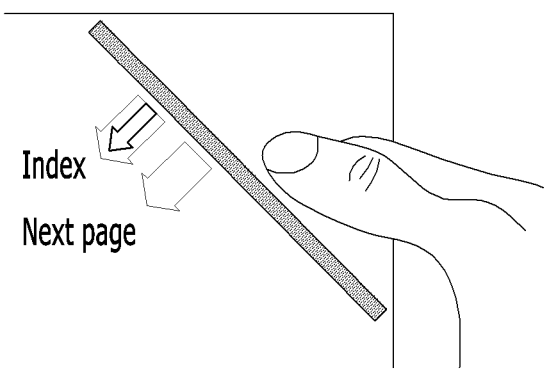
(b) Optimal point
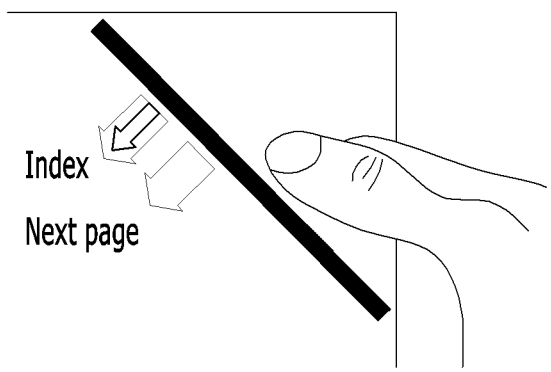
(c) End point

US 9,766,658 B2

FLEXIBLE DISPLAY DEVICE HAVING GUIDE FUNCTION OF GESTURE COMMAND AND METHOD THEREOF

CROSS-REFERENCE TO RELATED APPLICATION

This application claims priority to and the benefit of Korean Patent Application No. 10-2013-0059710 filed in the Korean Intellectual Property Office on May 27, 2013, the entire contents of which are incorporated herein by reference.

BACKGROUND (a) Technical Field

This disclosure relates to a flexible display device which is capable of inputting a command by changing a form and a command input method thereof.

(b) Description of the Related Art

In order to control smart equipment using a flexible display device, a method of inputting a command by changing the form of, i.e., deforming, the flexible display device is disclosed in U.S. Pat. No. 7,109,967. This related art document mainly discloses the identification of a command in accordance with the operation of the user using a sensor layer which may recognize a shape deformation of the display device.

There are several important points which need to be considered when a user command is input changing a form (deforming) a flexible display device. A first problem is that there is uncertainty with respect to not only whether or not a command has occurred but also what specific command the user intended. This uncertainty results from ambiguity of the operation of the user and variety of individual operating range. For example, in the case of "bending" operation, criteria of a bending range and angle of the display device are different for every user. Therefore, which command is input may be unclear. A second problem is to restrict the operation of the user so as not to deform the flexible display device to a level where the flexible display device cannot be physically restored in the process of performing an operation while the user takes an action in order to input a command.

SUMMARY

A flexible display device having a guide function for a gesture command and a method thereof are provided which may resolve uncertainty when a user command is input using a deformation (form change) of the flexible display device.

Additionally, an operation of a user is restricted so as not to deform a flexible display device to a level which may not be physically restored while the user takes an action in order to input a command.

In an aspect, a flexible display device includes a flexible display panel configured to include a touch sensing function and a deformation recognizing function; and a control device configured to control the flexible display panel and including an operating command database. The control device is configured to identify operating command candidates from then operating command database based on at least one of a touch input data and deformation input data received from the flexible display panel, and to instruct the flexible display panel to display the operating command candidates on the flexible display panel.

The flexible display panel may include a display panel configured to display an image, a touch sensing panel which performs the touch sensing function, and, a deformation recognizing sensor panel which performs the deformation recognizing function.

The display panel, the touch sensing panel, and the deformation recognizing sensor panel may be combined by a lamination technique which uses a transparent adhesive sheet between the panels or a method which applies a resin between the panels and then applies heat or an ultrasonic wave to the panels to cure the resin.

The flexible panel may include a display panel configured to display an image and to include the touch sensing function, and a deformation recognizing sensor panel which performs the deformation recognizing function.

The operating command database may store data including contents of an operating command, a position on the flexible display device associated with the operating command, a shape of the deformed flexible display device associated with the operating command, or a degree of deformation of the flexible display device associated with the operating command.

The flexible display device may be configured to display the operation command candidates associated with the at least one of the touch input data and deformation input data using a displaying content stored in the control device, and the displaying content of the operating command candidate may include a content of the operating command, a symbol which indicates a deformation direction, and a line which distinguishes a portion to be deformed. A displayed status of at least a part of the displaying content of the operating command candidate may vary in accordance with the deformation of the flexible display device. A shape of at least a part of the displaying contents of the operating command candidate may vary in accordance with the deformation of the flexible display device. At least one of color, brightness, saturation, and concentration of at least a part of the displaying contents of the operating command candidate may vary in accordance with the deformation of the flexible display device. When the flexible display device starts to be deformed, all displayed operating command candidates may be displayed to be blurred and when the deformation progresses to approach an appropriate degree for inputting one of the displayed operating command candidates, the corresponding operating command candidate may be displayed to be thicker than the other operating command candidates.

When the deformation input data of the flexible display device indicates a deformation of the flexible display device approaches a restorable limit of the flexible display device, a warning display thereof may be provided to the user.

The control device may be configured to allow the user to change operating command data stored in the operating command database using the flexible display panel.

The control device may be configured to allow a plurality of users to set individual separate operating command databases using the flexible display panel.

When the flexible display panel is in an abnormal input status, the control device may release the flexible display panel from an operating command waiting mode which displays the operating command candidate and express at least one of a sound, a vibration, flickering, or a warning message display to the user to notify the abnormal input status. The control device may identify the abnormal input status when the at least one of the touch input data and deformation input data is not consistent with an operating command for a predetermined time after entering the operating command waiting mode or the same at least one of the touch input data and deformation input data for a same operating command is repeated at a predetermined number of times or more or the deformation input data indicates the flexible display device is maintained in a status where the flexible display device is deformed at a predetermined angle or larger for a predetermined time or longer.

The touch sensing function of the flexible display panel may be on a front surface and a rear surface which is opposite to the front surface on which the display is performed.

In another aspect, a method for operation a flexible display device is provided, method including: detecting touch by a user and determining a touched position; searching a set of operating command candidates corresponding to the touched position and displaying the set of operating command candidates; receiving an operating command selected from the set of operating command candidates; and performing the received operating command.

The receiving of the operating command may occur when the flexible display device is deformed in accordance with deformation data associated with the operating command selected from the set of operating command candidates.

The operating command guide method of the flexible display device may further include: receiving a study mode operating command by the user; displaying an operating command database on the flexible display device; displaying an operating command to be modified when touch data corresponding to the operating command is received by the control device; and determining that a command to modify an input operation of the operating command to be modified is input to update the operating command database when deformation data corresponding to an input operation of the operating command to be modified is repeated a predetermined number of times.

The operating command guide method of the flexible display device may further include receiving a user addition menu selecting command, providing a user profile setting screen, providing a screen which creates an operating command database per user, and storing the created operating command database per user.

The operating command guide method of the flexible display device may further include when an abnormal input status occurs, releasing the flexible display device from an operating command waiting mode in which the set of operating command candidates is displayed and expressing at least one of a sound, a vibration, flickering, and a warning message display to the user to notify the abnormal input status, generating a timer to periodically check the status of the flexible display device to determine whether the abnormal input status is released, and completing the operation when the abnormal input status is released and indicating the abnormal input status again using a sound or display when the abnormal input status is not released.

According to example embodiments, operating command candidates which may be input by detecting touch of the user are guided, the operating command corresponding to a degree of the deformation of the display device is displayed, and a deformation limit of the display device is displayed, which may help the user so as to accurately input a command and give a warning to the user so as not to deform the flexible display device to a degree beyond which the flexible display device cannot be physically restored.

BRIEF DESCRIPTION OF THE DRAWINGS

FIGS. 4A to 4E are various configuration diagrams of variable arrangements of a touch sensing panel, a deformation recognizing panel, and a display panel of the flexible display device according to an example embodiment.

FIG. 7 is a table illustrating a touched status, a form change, and a deformation degree for various operating commands of the user.

FIGS. 11A to 11C is a diagram illustrating the flexible display device according to an example embodiment which varies the display in accordance with a deformation degree of the display device.

DETAILED DESCRIPTION OF THE EMBODIMENTS

The present disclosure will be described more fully hereinafter with reference to the accompanying drawings, in which example embodiments are shown. As those skilled in the art would realize, the described embodiments may be modified in various different ways, all without departing from the spirit or scope of the present invention.

First, referring to FIGS. 1 to 4, a flexible display device according to an example embodiment will be described.

Figure 1:
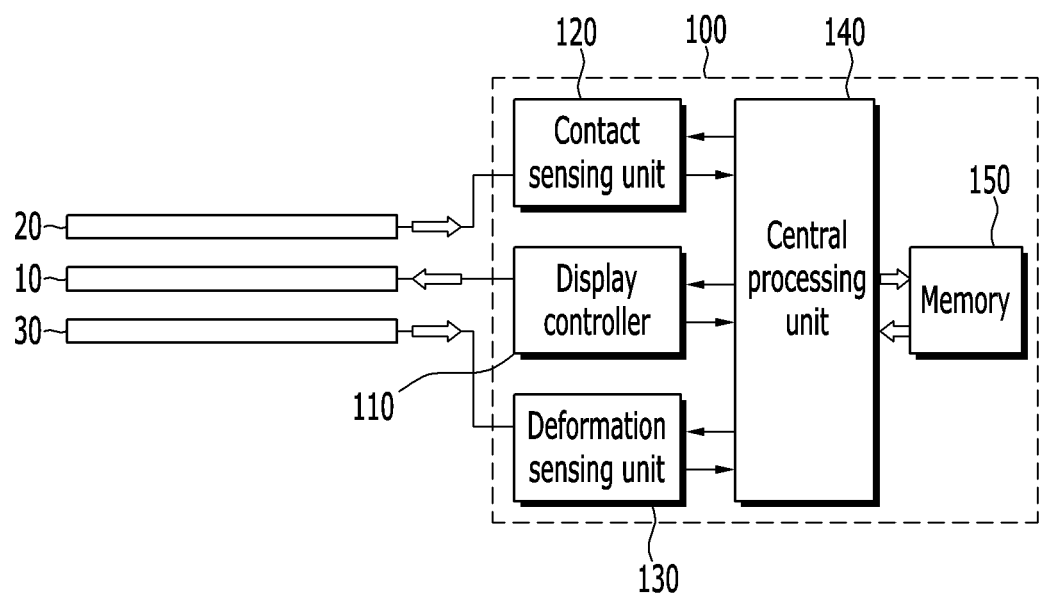
FIG. 1 is a block diagram of a flexible display device according to an example embodiment.
Figure 2:
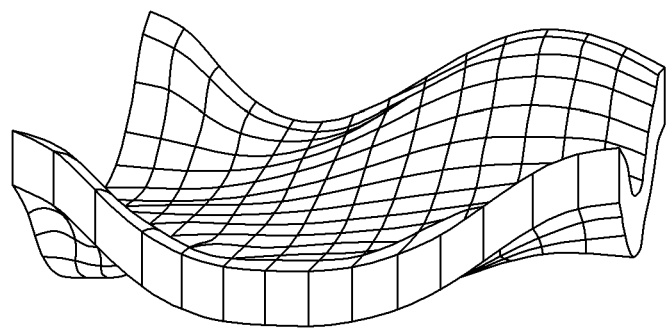
FIG. 2 is a conceptual diagram of a deformation recognizing sensor panel of the flexible display device according to an example embodiment.
Figure 3:
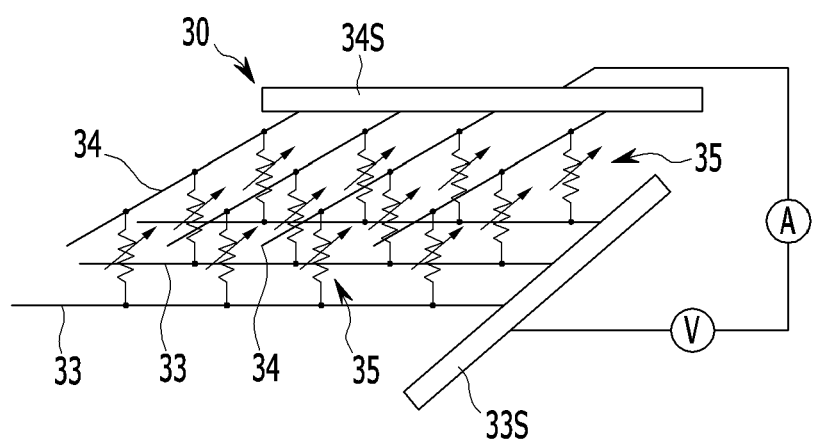
FIG. 3 is a circuit diagram of the deformation recognizing sensor panel of FIG. 2.

FIG. 1 is a block diagram of a flexible display device according to an example embodiment, FIG. 2 is a conceptual diagram of a deformation recognizing sensor panel of the flexible display device according to an example embodiment, and FIG. 3 is a circuit diagram of the deformation recognizing sensor panel of FIG. 2. FIGS. 4A to 4E are various configuration diagrams of variable arrangements of a touch sensing panel, a deformation recognizing panel, and a display panel of the flexible display device according to an example embodiment.

A flexible display device according to an example embodiment includes a display panel 10, a touch sensing panel 20, a deformation recognizing sensor panel 30, and a control device 100.

The control device 100 includes a display controller 110 which controls the display panel 10, a touch sensing unit 120 which receives a signal from the touch sensing panel 20 to analyze touch information of a user, a deformation sensing unit 130 which receives a signal from the deformation recognizing sensor panel 30 to analyze deformation information of the flexible display device, and a central processing unit 140. The central processing unit 140 controls operations of the display controller 110, the touch sensing unit 120, and the deformation sensing unit 130. For example, the central processing unit 140 controls the display controller 110 to perform required display operations based on information analyzed by the touch sensing unit 120 and the deformation sensing unit 130.

The display panel 10 is a flexible display panel which is formed of a flexible material and can be bent or deformed. Various types of flat panel displays (FPDs) may be used as the display panel 10, including, for example, a liquid crystal display (LCD), an organic light emitting display (OLED), or an electrowetting display (EWD).

The touch sensing panel 20 is a device which detects a position where the user touches a display screen. Various types of known touch panels may be adopted for use as sensing panel 20. Also, in addition to devices that are generally called touch panels, which detect a touch by an electrostatic manner or a pressure sensing manner, any unit that is capable of recognizing a touch made by a user may be used as touch sensing panel 20. For example, a panel in which pressure sensors are arranged may be used as the touch sensing panel 20. The touch sensing panel 20 is also formed of a flexible material and can be deformed. The touch sensing panel 20 detects data, such as the number of recognized touch points, positions of the recognized touch points, and a relative angle formed between points. The display device uses the data received from the touch sensing panel 20 as basic data for searching for a set of operating command candidates which may be associated with the touch data, as will be described in more detail below.

The deformation recognizing sensor panel 30 is a device which can detect a change in shape, and what the shape change is, when the panel is deformed. The deformation recognizing sensor panel 30, as illustrated in FIG. 2, detects data from the multi-axial deformed panel and the display device analyzes a value of each sensor in the deformation recognizing sensor panel 30 to deduct a three-dimensional shape. In the case of the deformation recognizing sensor panel 30 of FIG. 2, the sensors may be disposed at every intersection of straight lines or at the center of each cell, which is a region formed when two straight lines intersect. Alternatively, several sensors may be set as one cell. Referring to FIG. 3, a horizontal sensing line 33 and a vertical sensing line 34 are formed to intersect each other, and a variable resistor 35 is connected between the two sensing lines 33 and 34 at every intersection of the horizontal sensing line 33 and the vertical sensing line 34. A horizontal scanning circuit 33S is connected to one end of each horizontal sensing line 33, and a vertical scanning circuit 34S is connected to one end of each vertical sensing line 34. A resistance value of the variable resistor 35 varies depending on the pressure at the resistor 35, and the variable resistor 35 converts the changes in pressure that occur at the variable resistor 35 when the panel is deformed into current that is proportional to the change in pressure. The horizontal scanning circuit 33S sequentially applies a predetermined voltage V to the vertical sensing lines 33 and the vertical scanning circuit 34S measures a current A which is output from the vertical sensing line 34 to detect a resistance value of the variable resistor 35 at each intersection. Distribution of the detected resistance values is analyzed to deduct a deformed shape of the panel. The deformation recognizing sensor panel 30 is one of example of a deformation recognizing sensor panel, and different types of deformation recognizing sensor panels may be used.

The touch sensing panel 20, the display panel 10, and the deformation recognizing sensor panel 30 are combined by using a lamination technique in which a transparent adhesive sheet is disposed between the panels 20, 10, and 30 and heat or pressure is applied thereto to combine the panel, or by using a process in which a resin is applied between the panels 20, 10, and 30 and then heat or an ultrasonic wave is applied to cure the resin.

Relative positions of the touch sensing panel 20, display panel 10 and deformation recognizing sensor panel 30 may be modified in various ways other than the structure illustrated in FIG. 1. For example, as illustrated in FIG. 4A, the deformation recognizing sensor panel 30 may be disposed between the touch sensing panel 20 and display panel 10, and as illustrated in FIG. 4B, the touch sensing panel 20 may be disposed between the deformation recognizing sensor panel 30 and the display panel 10. Further, the touch sensing panel 20, the display panel 10, and the deformation recognizing sensor panel 30 may be implemented as one or two panels rather than as separate panels. For example, as illustrated in FIG. 4C, a touch sensor embedded display panel 11 in which a touch sensing function is embedded in the display panel itself may be used, and only the deformation recognizing sensor panel 30 may be separately formed. Further, as illustrated in FIG. 4D, the deformation recognizing sensing function may be embedded in the display panel 12 itself and the touch sensing panel 20 may be separately disposed or as illustrated in FIG. 4E, the deformation recognizing sensor and the touch sensor may be implemented in one panel 23 and the display panel 10 may be separately disposed. Further, both the deformation recognizing sensor and the touch sensor may be embedded in the display panel.

A flexible display device according to an example embodiment is equipped with an operating command input system which recognizes as a command input that a user has deformed the shape of the display device. That is, the control device 100 includes an operating command input system which uses signals received from the deformation recognizing sensor panel 30 when it is deformed to identify when a command is input into the display device and what the command is. For example, according to an example input system, if the user bends a right edge of the display device to the front side, such a deformation is recognized as a command that instructs the display device to display a next page on the display panel 10, and if the user bends the right edge of the display device to the rear side, such a deformation is recognized as a command that instructs the display device to display a previous page on the display panel 10. This is possible because the deformation of the flexible display device is three-dimensionally recognized via the deformation recognizing sensor panel 30. The deformation recognizing sensor panel 30 outputs a detection signal to the deformation sensing unit 130. The deformation sensing unit 130 analyzes the detection signal and creates a signal which represents the three-dimensional shape of the deformed display panel, and then outputs the signal to the central processing unit 140. The central processing unit 140 receives the signal and performs a search for a corresponding command among a set of potential operating commands that matches the received signal. The central processing unit 140 then performs the identified input command. For example, if the user bends the right edge of the display device to the front side, the deformation recognizing sensor panel 30 and the deformation sensing unit 130 output a signal which represents that deformed shape to the central processing unit 140, and the central processing unit 140 which receives the output signal confirms that a command for displaying a next page among the operating commands is input, and the display panel 10 controls the display controller 110 to display the next page. Further, the touch sensing panel 20 of the flexible display device according to an example embodiment not only serves as an input device which can detects a position on the flexible display device touched by a user to directly receive the command, but also configures a part of an operating command guide system which detects a position on the display device which is held by the user and then, based on the position (and in conjunction with the data from the deformation recognizing sensor panel 30), displays a set of operating command candidates that may be subsequently performed by the display.

In order to deform a shape of the display device to input the operating command, the user needs to hold the display device and apply a physical force thereto. In this case, the portion of the display device which is held by the user may vary depending on the type of operating commands to be input, so that if the position of the display device held by the user is confirmed, the operating command candidates which may be subsequently performed may be searched. If the operating command candidates searched as described above are displayed through the display panel 10, the user may precisely notice how to deform the flexible display device and how much the flexible display device needs to be deformed in order to input a desired operating command so that the operating command may be clearly input. Further, if the user varies the display in accordance with a degree of deformation of the flexible display device in order to input the operating command, the user may easily distinguish and input the operating command varying only the degree of deformation and may receive a warning in advance so as to prevent the flexible display device from being deformed to be broken.

Additionally, contents of the operating command may be modified or changed in accordance with a desire of the user, and if there is a plurality of users, the operating commands may vary depending on the users.

Further, in order to prevent the display device from displaying and maintaining a display of an operating command (referred to as an operating command waiting mode) as the result of an unintentional touch or deformation of the flexible display device, if an abnormal input status occurs, the operating command waiting mode is released and the user is notified of the abnormal input status so o the user can get out of the abnormal input status.

In addition to the central processing unit 140, the control device 100 may include a memory X, e.g. random access memory (RAM) and/or read only memory (ROM), which may store various databases used by the flexible display device. For example, an operating command database X, which stores the set of possible commands associated with the signals (e.g., touch input data and deformation input data) received from the deformation recognizing sensor panel 30 and the touch sensing panel 20, may be stored in the control device 100.

Such a flexible display device may be used as a display unit for various electronic devices such as a smart phone, a tablet PC, or an electronic book.

Hereinbelow, an operation of the flexible display device according to an example embodiment will be described.

First, referring to FIGS. 5 to 10, a method of guiding an operating command in the flexible display device according to an example embodiment will be described.

Figure 5:
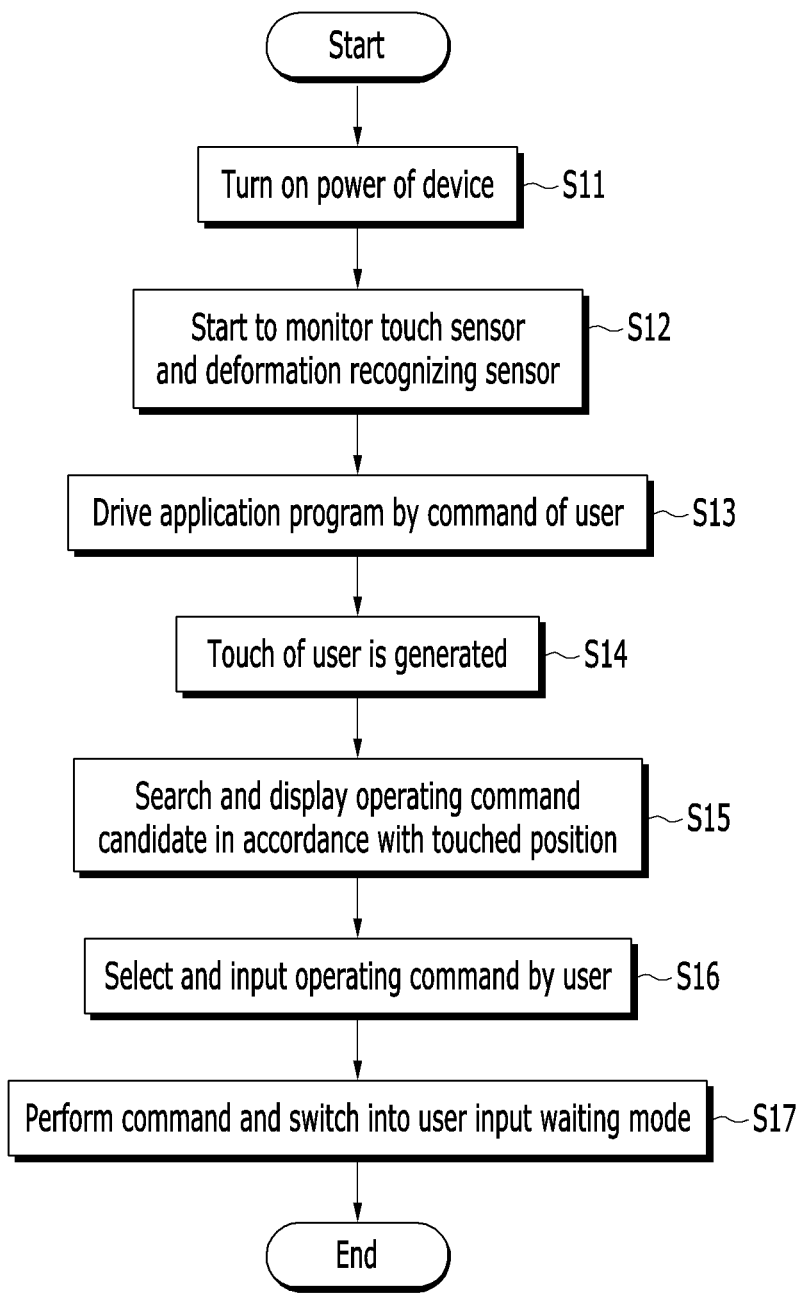
FIG. 5 is a flowchart illustrating a process of receiving an operating command in the flexible display device according to an example embodiment.
Figure 6:
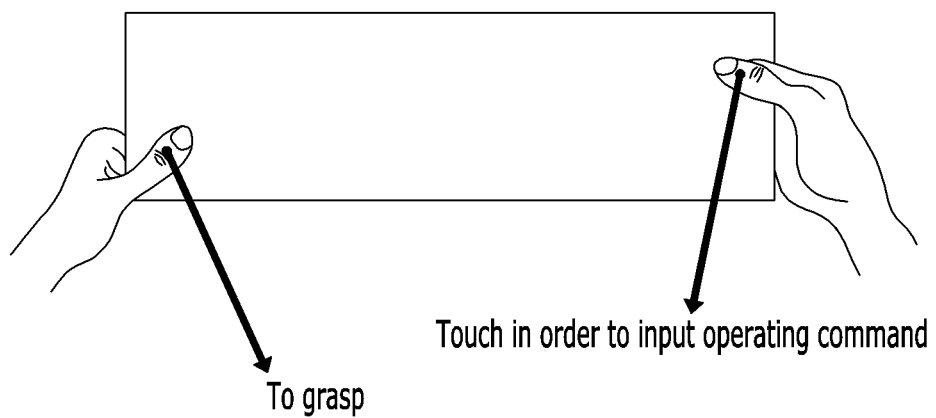
FIG. 6 is a diagram illustrating a touched status of the flexible display device by a user.
Figure 8:
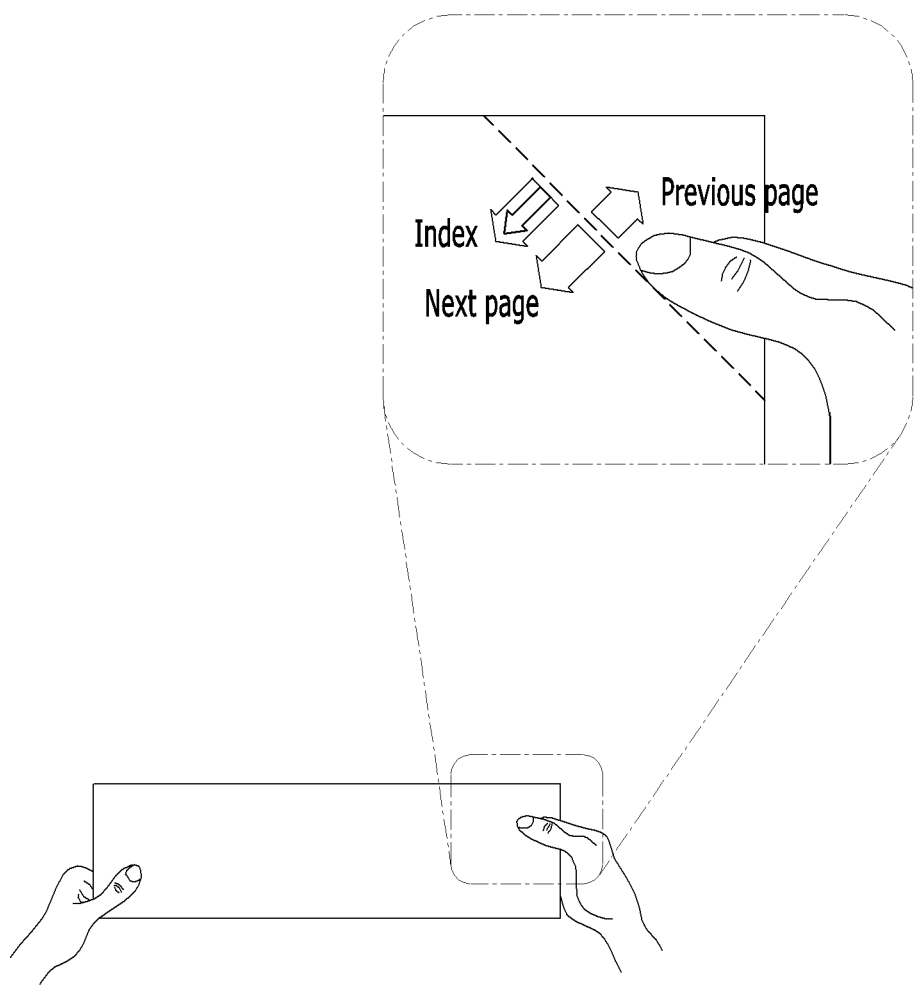
FIG. 8 is a diagram illustrating a status where the flexible display device according to an example embodiment displays an operating command candidate in accordance with a touched position.
Figure 9:
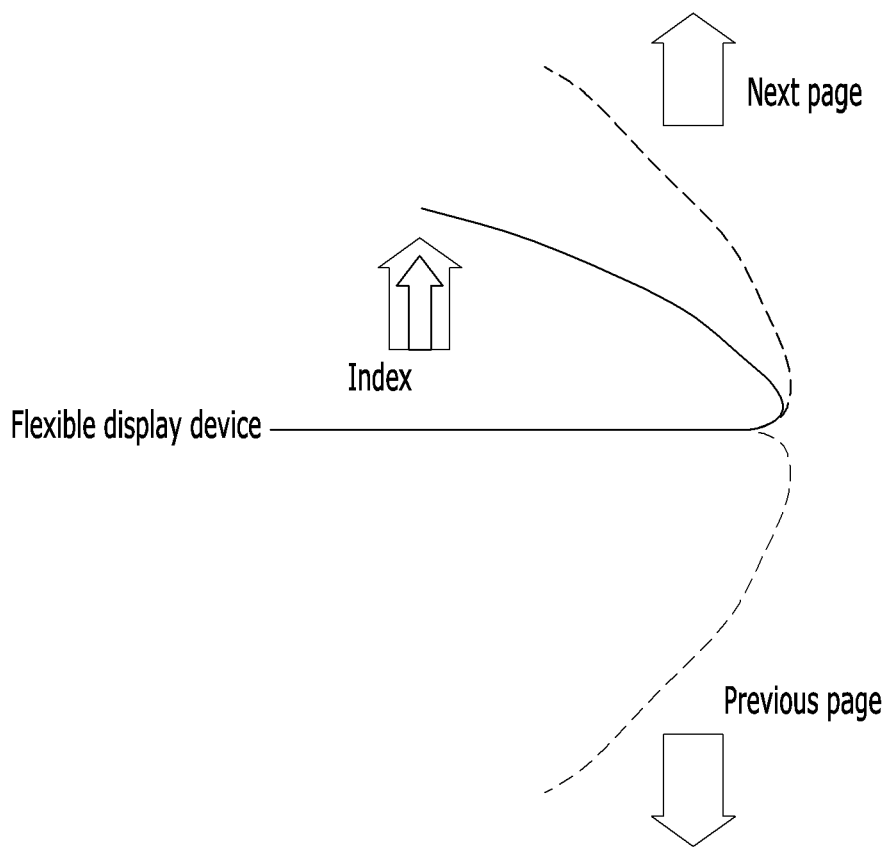
FIG. 9 is a diagram illustrating an operating command in accordance with a deformation degree of the flexible display device according to an example embodiment from the viewpoint of the flexible display device.
Figure 10:
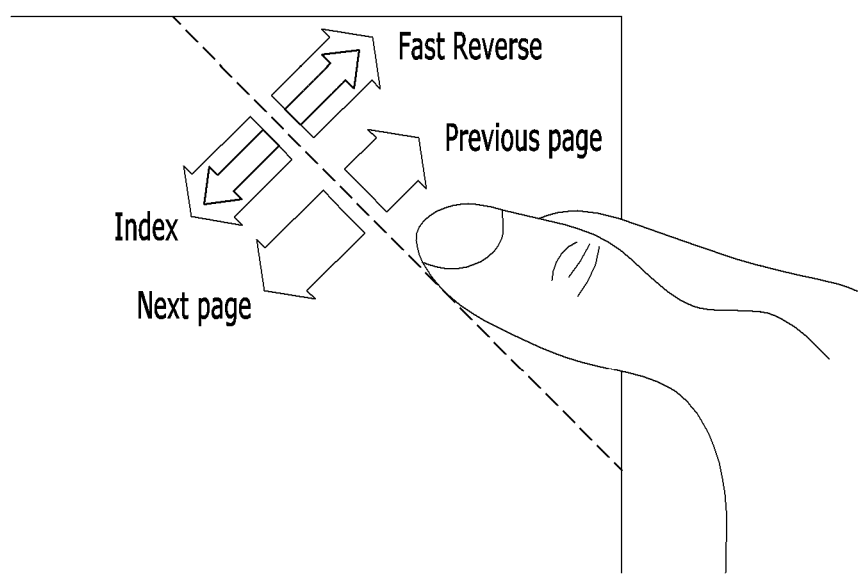
FIG. 10 is a diagram illustrating an input operating command which varies in accordance with a degree of deformation of a display device in the flexible display device according to an example embodiment.

FIG. 5 is a flowchart illustrating a process of receiving an operating command in the flexible display device according to an example embodiment, FIG. 6 is a diagram illustrating a touched status of the flexible display device by a user, and FIG. 7 is a table illustrating a touched status, a form change, and a deformation degree for various operating commands of the user. FIG. 8 is a diagram illustrating a status where the flexible display device according to an example embodiment displays an operating command candidate in accordance with a touched position, FIG. 9 is a diagram illustrating an operating command in accordance with a deformation degree of the flexible display device according to an example embodiment from the viewpoint of the flexible display device, and FIG. 10 is a diagram illustrating an input operating command which varies in accordance with a degree of deformation of a display device in the flexible display device according to an example embodiment.

Referring to FIGS. 1 and 5, if power equipment that includes the flexible display device is turned on at S11, the central processing unit 140 controls the touch sensing unit 120 and the deformation sensing unit 130 to start monitoring the touch sensing panel 20 and the deformation recognizing sensor panel 30 at S12. When the user touches an icon displayed on a screen of the flexible display device or instructs any application to be activated using any other input unit, the central processing unit 140 drives the application program and an activated screen of the application is displayed on the display panel 10 at S13.

Next, when the user holds the flexible display device in order to input an operating command, the touch is established and the touch sensing panel 20 detects the touch and outputs a detection signal to the touch sensing unit 120, and the touch sensing unit 120 analyzes the detection signal to determine the touched position at S14. For example, as illustrated in FIG. 6, in order to input the operating command, the user needs to hold one edge of the display device with one hand (in order to grasp) and hold a portion to be deformed in order to input the operating command by the other hand so that a touch occurs in a predetermined portion of the flexible display device.

The touch sensing unit 120 outputs determined touched position data to the central processing unit 140, and the central processing unit 140 searches and identifies the operating command candidate corresponding to the touched position to display the operating command candidate on the display panel 10 at S15. Data for an operating command may be stored in a non-volatile memory which is provided inside or outside the central processing unit 140, or may include data for contents of an operating command, a touched position when the operating command is input, a shape of the deformed flexible display device when the operating command is input, a level of force which is applied when the operating command is input or a degree (angle) of deformation.

FIG. 7 illustrates examples of data for operating commands.

As illustrated in FIG. 7, there may be a plurality of operating commands corresponding to the same touched position. In an example of FIG. 7, the touched positions corresponding to an operating command ("Next page"), which instructs the display device to display a next page, an operating command ("Previous page"), which instructs the display device to display a previous page, and an operating command ("Index"), which instructs the display device to display an index are similar. Further, touched positions corresponding to an operating command ("Zoom in"), which instructs the display device to enlarge the screen, and an operating command ("Zoom out"), which instructs the display device to reduce the screen are similar to each other. The deformed shapes of the operating command ("Next page"), which instructs the display device to display a next page, and the operating command ("Index"), which instructs the display device to display an index are similar to each other, but the degrees (angles) of the deformation are different from each other. In other words, when one edge of the flexible display device is forward bent at 1 to 3 degrees, it means the operating command ("Next page"), which instructs the display device to display a next page, and when the one edge of the flexible display device is forward bent at 6 to 10 degrees, it means the operating command which instructs the display device to display an index. Therefore, when the touched position is near a diagonal corner of the flexible display device, the operating command ("Next page"), the operating command ("Previous page"), and the operating command ("Index") are searched as operating command candidates and displayed on the display panel 10 as illustrated in FIG. 8. In FIG. 8, a direction of an arrow indicates a bending direction and two overlapping arrows indicated that the bending degree should be large. That is, as shown in FIG. 9, when the corner of the flexible display device is bent upward/forward only slightly (indicated by the upper dotted line in FIG. 9), it is the operating command ("Next page") and when the corner is bent upward/forward significantly (to a much larger degree) (indicated by the solid line in FIG. 9), it is the operating command ("Index"). Further, if the corner is bent downward/backward (indicated by the lower dotted line in FIG. 9), it is the operating command ("Previous page"). In FIG. 8, the dotted line represented in the display panel 10 is a line which distinguishes a portion to be bent.

In addition to the operating commands illustrated in FIG. 7, various other operating commands may be included. For example, when the corner of the flexible display device is bent downward/backward significantly, it may be used as an operating command ("Fast Reverse"), which instructs the display device to display previous several pages (for example, five pages). In this case, if the touched position is near the diagonal corner of the flexible display device, in addition to the operating command ("Next page"), the operating command ("Previous page"), and the operating command ("Index"), the operating command ("Fast Reverse") which instructs to display previous several pages (for example, five pages) is also searched as the operating command candidate and displayed on the display panel 10 as illustrated in FIG. 10.

A deformation operation for the operating command or the touched position may be defined by a manufacturer of the flexible display device in advance, or the user may manipulate the flexible display device to newly define the deformation operation or the touched position, or to change a set definition.

Next, referring to FIG. 5, if the user selects one of the operating command candidates displayed on the display panel 10 to perform the corresponding deformation operation, the operating command is input at S16. The input of the operating command may be confirmed when the flexible display device is restored after the user performs the deformation operation or a predetermined time has elapsed in a status when the corresponding deformation operation is performed.

If the operating command is input, the central processing unit 140 performs the command and then switches a mode of the equipment into a user input waiting mode at S17.

At S15 of FIG. 5, not only does the operating command simply display the operating command candidate, but it also varies the display depending on the degree of deformation so as to represent an appropriate deformation amount and deformation limit when the flexible display device is deformed in order to input the operating command, as illustrated in FIG. 11. In FIG. 11, when the user starts to bend the corner of the flexible display device, the slanted band which indicates the bending position is represented with light gray, and as the bending degree is gradually increased to be appropriate for inputting the operating command, the color of slanted band goes thicker. Further, when the bending degree approaches a restorable limit, the slanted band indicating the bending position is represented with black so that the user may intuitively notice the appropriate deformation degree and the deformation of the flexible display device beyond the restorable limit may be avoided. Although the bending degree is illustrated in FIG. 11 with light gray (a), medium gray (b), and black (c), in a color display, the bending degree may be indicated with colors. For example, the starting point (a) may be indicated with a yellow line, the optimal point (b) may be indicated with a blue line, and the end point (c) may be indicated with black.

In this method in which what is displayed is varied in accordance with the deformation degree, various other display options may be used to indicate an operation command candidate in addition, or alternatively, to what is illustrated in FIG. 11. For example, the display may vary brightness, saturation, or concentration of an image to indicate the operating command candidates. For example, if the user starts to bend the corner of the flexible display device, all operating command candidates are displayed to be blurred and then if the bending degree approaches an appropriate degree for inputting one of the operating command candidates, the corresponding operating command candidate is heavily and clearly displayed. Further, if the bending degree exceeds the appropriate degree, the operating command candidate is displayed again to be blurred and if the bending degree approaches the restorable limit point, the entire displayed operating command candidates are displayed to be red or flickered. A method that varies the display in accordance with the deformation degree may include a method which varies the shape of the image which represents the operating command candidate. For example, as the deformation progresses, a line which distinguishes a portion to be deformed is changed from a straight line into a dotted line, or a thickness of the straight line is changed.

When a bending degree or other deformation has reached the restorable limit of the flexible display device, the display device may be display an indication (or warning) that the restorable limit has been reached by providing, for example, one screen flickering, a warning message display, vibration, and a sound or a combination thereof. A warning for the restorable limit of the flexible display device may be performed in connection with the display of the operating command or independently performed separately from the display of the operating command. For example, even when the flexible display device is deformed for reasons other than for performing the operating command, for example due to the influence of the surrounding environment, the warning for the restorable limit of the flexible display device may be provided.

Such a user guide method may be defined in advance by the manufacturer or may be changed by the user later and stored in a memory in a form of a code or implemented by an environment setting program, a user application program or a basic program which is installed in an operating system (OS).

In the flexible display device according to an example embodiment, the contents of the operating command may be modified and changed in accordance with the desire of the user.

Figure 12:
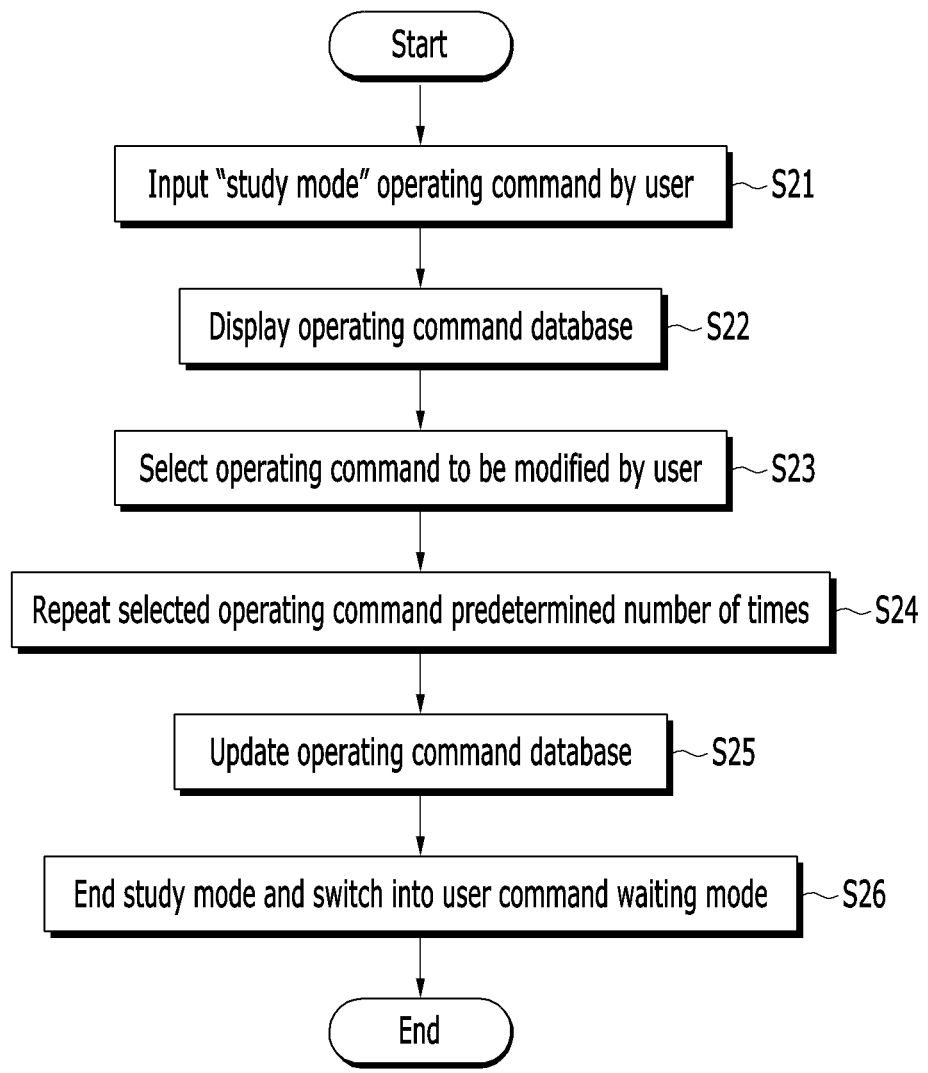
FIG. 12 is a flowchart illustrating a process of changing an operating command in the flexible display device according to an example embodiment.
Figure 13:
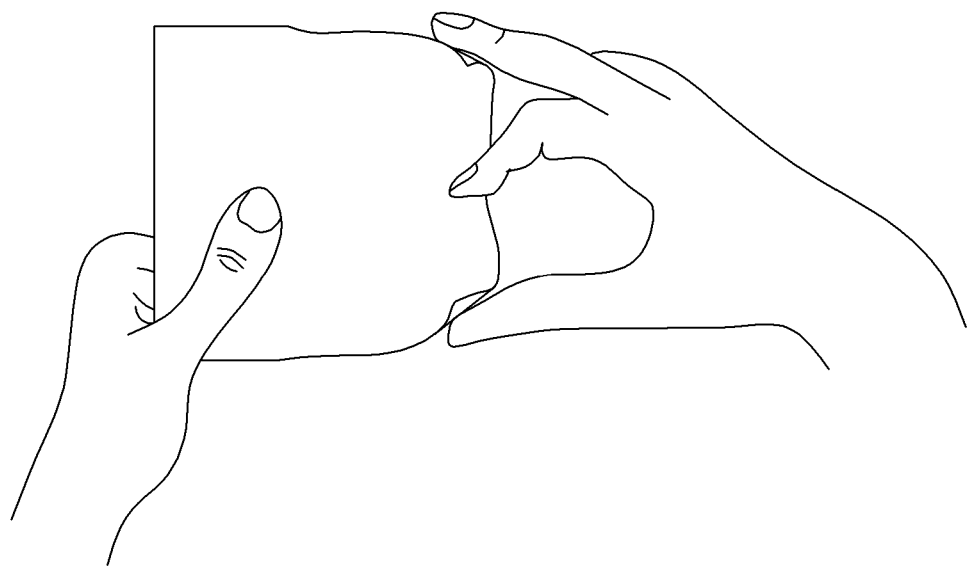
FIG. 13 is an illustrative diagram of an operation illustrating a study mode entering command in the flexible display device according to an example embodiment.
Figure 14:
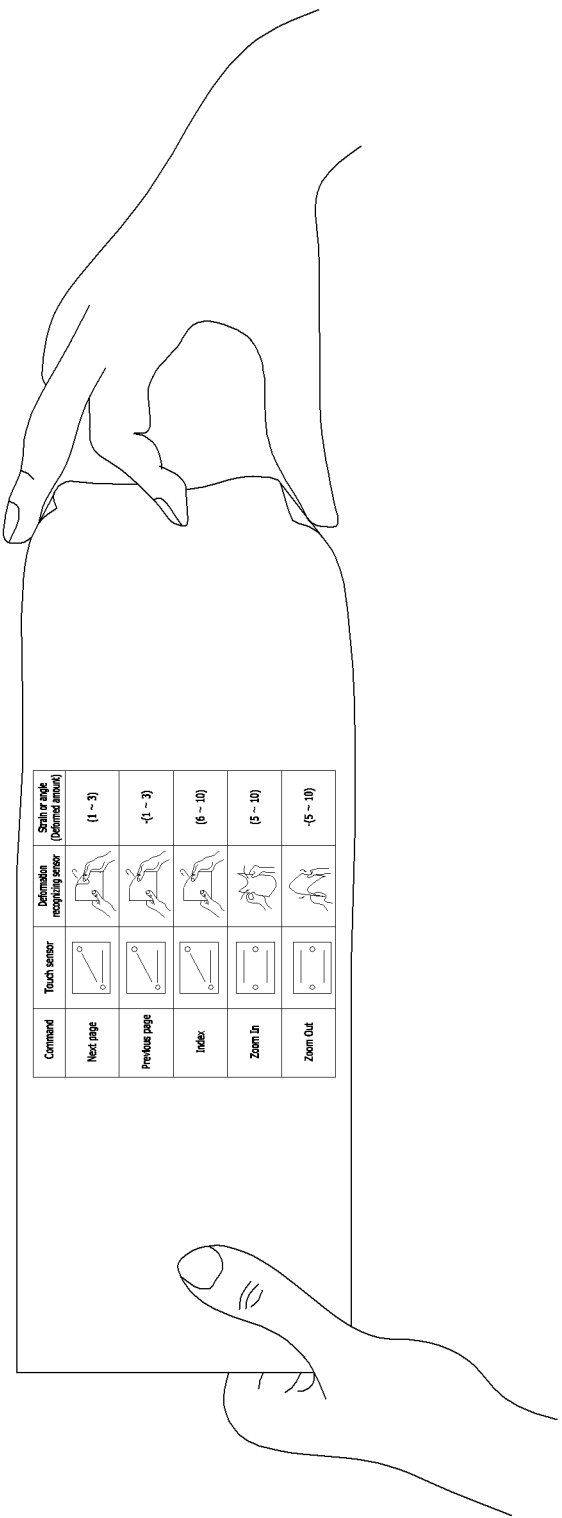
FIG. 14 is a diagram illustrating an operating command database which is displayed as the study mode entering command illustrated in FIG. 13 is input.

FIG. 12 is a flowchart illustrating a process of changing an operating command in the flexible display device according to an example embodiment, FIG. 13 is an illustrative diagram of an operation illustrating a study mode entering command in the flexible display device according to an example embodiment, and FIG. 14 is a diagram illustrating an operating command database which is displayed as the study mode entering command illustrated in FIG. 13.

When the user wants to modify the contents of the operating commands that are available in connection with a particular deformation of the display device, first, the user inputs an operating command which instructs the display device to enter a "study mode" at S21. The operating command which instructs the display device to enter the "study mode", as illustrated in FIG. 13, may be established by bending two corners of the flexible display device toward the front side and pushing a center of the two corners to the rear side. However, the operation of the operating command which instructs the display device to enter the "study mode" is not limited thereto, but may be defined by other operations.

When the operating command which instructs the display device to enter the "study mode" is input, the central processing unit 140, as illustrates in FIG. 14, displays an operating command database on the display panel 10 at S22.

Next, the user selects an operating command to be modified using a method such as touch input at S23. A deformation operation which the user desired to be used as an input operation for the selected operating command is repeated a predetermined number of times (for example, three times) at S24. The central processing unit 140 determines that the command to modify the input operation of the operating command is input and updates the operating command database at S25.

Next, the study mode ends by the user input or by updating the operating command database, and the display device is switched into a user command waiting mode at S26.

The flexible display device according to an example embodiment uses a plurality of operating command databases so that each individual user may have a separate operating command databases. Such a function is highly utilized when several users use one piece of equipment.

Figure 15:
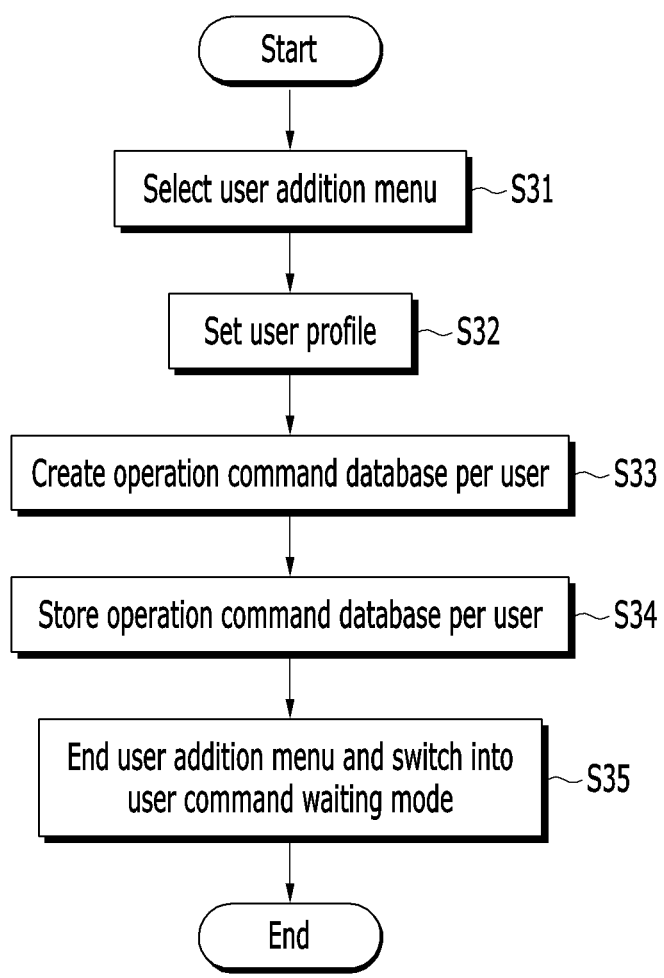
FIG. 15 is a flowchart illustrating a process of creating an operating command database per user in the flexible display device according to an example embodiment.

FIG. 15 is a flowchart illustrating a process of creating an operating command database per individual user in the flexible display device according to an example embodiment.

When the user selects a user addition menu either through a screen touch or by inputting the operating command at S31, the central processing unit 140 provides a user profile setting screen to set a user profile at S32. The user profile may include, for example, information such as a name or a nick name of the user, a section symbol, and a model number which may distinguish the equipment.

When the user profile setting is completed, the central processing unit 140 provides a screen which creates the operating command database associated with the individual user to provide an environment which allows that user to create the operating command database by him/herself at S33. In this case, the user may use an operating command database as it is, which is set by the manufacturer in advance, or select a part of the operating command, or the user may directly define a necessary command to create his/her own operating command database.

When the operating command database associated with the individual user is created, the operating command database is stored in S34. The operating command database may be stored by the command of the user or automatically stored simultaneously at the time of creating the operating command database.

Next, the study mode ends by the input of the user or by storing the operating command database associated with the individual user, and the display device is switched into the user command waiting mode at S26.

The operating command database associated with an individual user created by the above-described method is stored in the equipment which uses the personalized operating commands, or is stored in a mobile storage medium such as a USB (universal serial bus) and loaded to be used at the time of usage.

An abnormal operating command response process which may prevent a battery from being consumed or a lifespan of the display device from being shortened by maintaining the equipment in the operating command waiting status when an unintended touch or deformation occurs may be provided in the flexible display device according to an example embodiment of the present invention.

Figure 16:
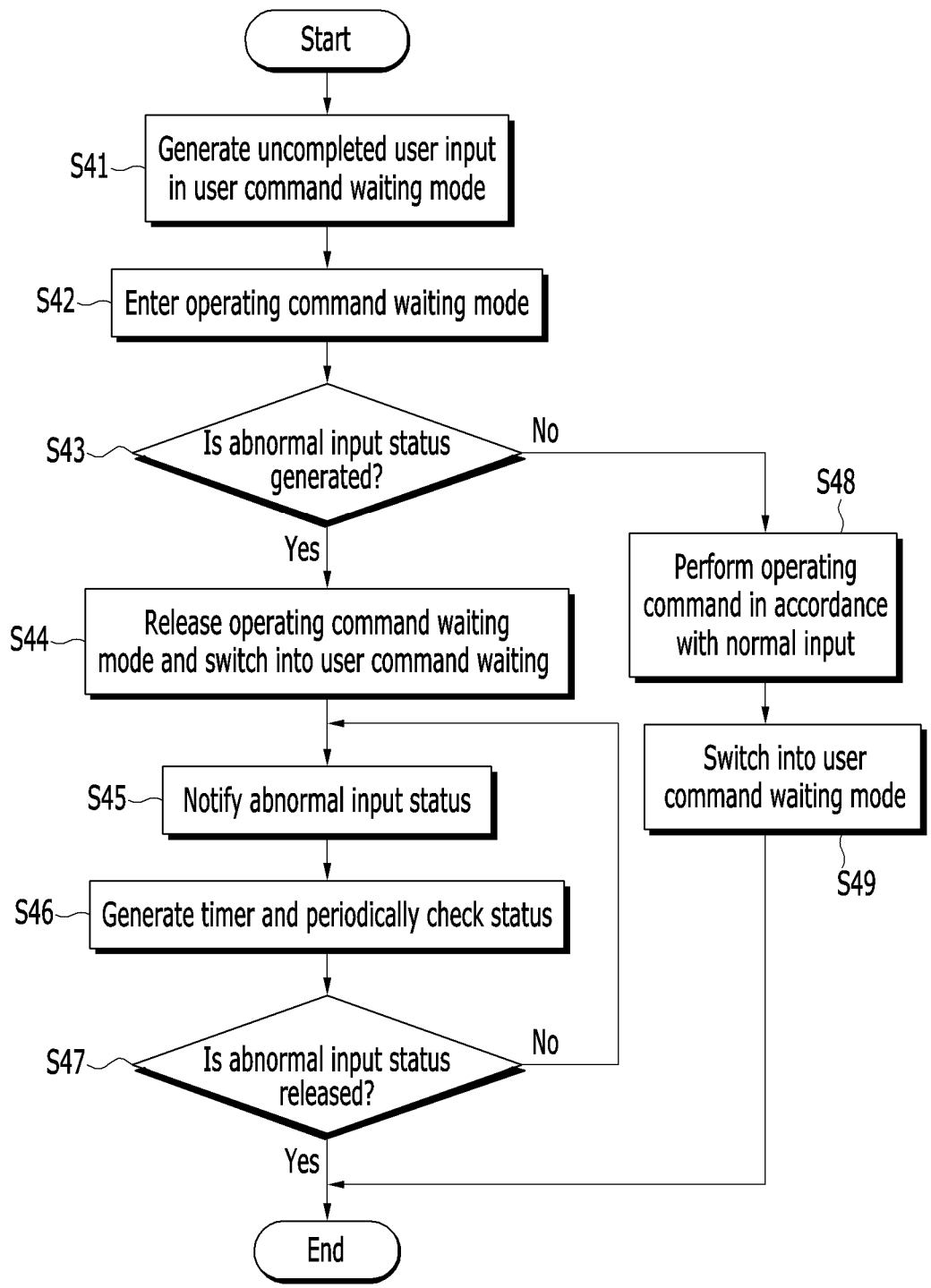
FIG. 16 is a flowchart illustrating a subsequent processing process when an abnormal operating command occurs in the flexible display device according to an example embodiment.

FIG. 16 is a flowchart illustrating a subsequent processing process for when an abnormal operating command occurs in the flexible display device according to an example embodiment.

When a touch input or deformation of the flexible display device which is not intended by the user (hereinafter, referred to as an "uncompleted user input") occurs in the flexible display device while it is in the user command waiting mode at S41, the flexible display device enters an operating command waiting mode at S42. Here, the operating command waiting mode refers to a status in which the display device displays the operating command candidates as illustrated in FIG. 8 or 9.

Next, it is determined that an abnormal input status has occurred at S43. Such an abnormal input status could occur when for example, no input event occurs, or the same operating command is repeatedly input for a predetermined time (for example, one to ten seconds), or the flexible display device is physically deformed more than a defined amount and the deformed status is maintained for a predetermined time or longer. If such an abnormal input status occurs, the operating command waiting mode is released and the mode is switched into the user command waiting mode at S44. Further, a sound, a vibration, flickering, or other sort of warning message display is expressed to the user to notify the user that the flexible display device is in an abnormal input status which should lead the user to releasing the abnormal input status at S45. One or two or more of the sound, the vibration, the flickering, and other sort of warning message displays may be expressed. Next, a timer is set to periodically check the status of the flexible display device at S46, and it is determined whether the abnormal input status is released at S47. If the abnormal input status is released, the operation ends as it is, and if the abnormal status is not released, S45 to S47 are repeated.

At S43, if the abnormal input status does not occur, the operating command is performed in accordance with the normal input at S48, and then the mode is switched into the user command waiting mode at S49.

Figure 17:
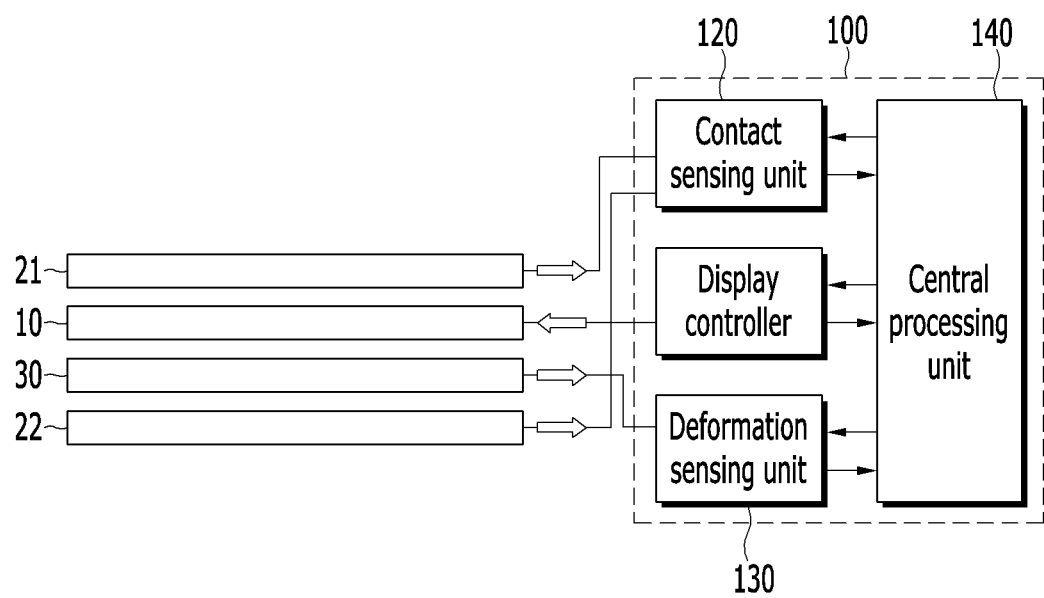
FIG. 17 is a block diagram of a flexible display device according to an example embodiment.

FIG. 17 is a block diagram of a flexible display device according to an example embodiment.

As compared with the flexible display device of FIG. 1, the flexible display device of FIG. 17 includes two touch sensing panels 21 and 22. Such a flexible display device can detect a touch that occurs not only at the front surface of the display device, but can also detect a touch that occurs at the rear surface. When the user holds flexible display device in order to deform the shape of the flexible display device to input the operating command, the hands of the user may touch both the front surface and also the rear surface of the flexible display device. When the touch positions of the front surface and the rear surface are checked, the information provided to the display device to determine the operating command candidates is increased, so that a more accurate search for the intended operating command may be accomplished. Alternatively, the touch panel on the front surface may be used only to input commands, and the touch panel on the rear surface may be used to provide information to the display device for searching the operating command candidate. Alternatively, the touch panel on the front surface may be used to provide information to the display device for searching the operating command candidate, and the touch panel on the rear surface may be used to input a command.

Arrangement of the touch sensing panels 21 and 22, the display panel 10, and the deformation recognizing sensor panel 30 may be varied. For example, the deformation recognizing sensor panel 30 may be disposed at the outermost side and the display panel 10 may have a touch sensing function and the deformation recognizing sensor panel 30 may also have a touch sensing function. Further, the display panel 10 may have the touch sensing function therein and the touch sensing panel 22 at the rear side may be formed separately from the deformation recognizing sensor panel 30 or the display panel 10. Further, the touch sensing panel 21 at the front side may be omitted and only the touch sensing panel 22 at the rear side may be disposed.

The types of the two touch sensing panels 21 and 22 may also be different from each other. For example, a general touch panel may used for the touch sensing panel 21 at the front side and a pressure sensor array may be used for the touch sensing panel 22 at the rear side, or a general touch panel may used for the touch sensing panel 21 at the rear side and a pressure sensor array may be used for the touch sensing panel 22 at the front side.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the disclosure, including the appended claims.

What is claimed is:

1. A flexible display device, comprising:
a flexible display panel configured to include a touch sensing function and a deformation recognizing function; and
a control device configured to control the flexible display panel and including an operating command database,
wherein the control device is configured to identify operating command candidates from the operating command database based on a touch input data received from the flexible display panel, and to instruct the flexible display panel to display the operating command candidates on a display screen of the flexible display panel,
wherein the touch input data includes a number of touch points recognized by the flexible display panel, positions of the touch points, and a relative angle formed between the touch points, and
wherein the operating command candidates displayed on the display screen correspond to a specific touch position and illustrate how to deform the flexible display device to perform an associated operating command.

2. The flexible display device of claim 1, wherein:
the flexible display panel includes
a display panel configured to display an image,
a touch sensing panel which performs the touch sensing function, and
a deformation recognizing sensor panel which performs the deformation recognizing function.

3. The flexible display device of claim 2, wherein:
the display panel, the touch sensing panel, and the deformation recognizing sensor panel are combined by a lamination technique which uses a transparent adhesive sheet between the panels, or a method which applies a resin between the panels and then applies heat or an ultrasonic wave to the panels to cure the resin.

4. The flexible display device of claim 1, wherein:
the flexible panel includes a display panel configured to display an image and to include the touch sensing function, and a deformation recognizing sensor panel which performs the deformation recognizing function.

5. The flexible display device of claim 1, wherein:
the operating command database stores data including contents of an operating command, a position on the flexible display device associated with the operating command, a shape of the deformed flexible display device associated with the operating command, or a degree of deformation of the flexible display device associated with the operating command.

6. The flexible display device of claim 1, wherein:
the flexible display panel is configured to display the operating command candidates associated with the touch input data using a displaying content stored in the control device, and the displaying content of the operating command candidate includes a content of the operating command, a symbol which indicates a deformation direction, and a line which distinguishes a portion to be deformed.

7. The flexible display device of claim 6, wherein:
a displayed status of at least a part of the displaying content of the operating command candidate varies in accordance with the deformation of the flexible display device.

8. The flexible display device of claim 7, wherein:
a shape of at least a part of the displaying contents of the operating command candidate varies in accordance with the deformation of the flexible display device.

9. The flexible display device of claim 7, wherein:
at least one of color, brightness, saturation, and concentration of at least a part of the displaying contents of the operating command candidate varies in accordance with the deformation of the flexible display device.

10. The flexible display device of claim 9, wherein:
when the flexible display device starts to be deformed, all displayed operating command candidates are displayed to be blurred and when the deformation progresses to approach an appropriate degree for inputting one of the displayed operating command candidates, the corresponding operating command candidate is displayed to be thicker than the other operating command candidates.

11. The flexible display device of claim 1, wherein:
when a deformation of the flexible display device approaches a restorable limit of the flexible display device, a warning therefor is displayed to the user.

12. The flexible display device of claim 1, wherein:
the control device is configured to allow the user to change operating command data stored in the operating command database using the flexible display panel.

13. The flexible display device of claim 1, wherein:
the control device is configured to allow a plurality of users to set individual separate operating command databases using the flexible display panel.

14. The flexible display device of claim 1, wherein:
when the flexible display panel is in an abnormal input status, the control device releases the flexible display panel from an operating command waiting mode which displays the operating command candidate and expresses at least one of a sound, a vibration, flickering, or a warning message display to the user to notify the abnormal input status.

15. The flexible display device of claim 14, wherein:
the control device identifies the abnormal input status when the at least one of the touch input data and deformation input data is not consistent with an operating command for a predetermined time after entering the operating command waiting mode or at least one of the touch input data and deformation input data for a same operating command is repeated at a predetermined number of times or more or the deformation input data indicates the flexible display device is maintained in a status where the flexible display device is deformed at a predetermined angle or larger for a predetermined time or longer.

16. The flexible display device of claim 1, wherein:
of the touch sensing function of the flexible display panel is on a front surface and a rear surface which is opposite to the front surface on which the display is performed.

17. A method for operating a flexible display device, the flexible display device including a flexible display panel configured with a touch sensing function and a deformation recognizing function and a control device configured to control the flexible display panel, the method comprising:
detecting touch by a user and determining touched positions on the flexible display panel;
searching a set of operating command candidates based on a touch data including a number of touch points, positions of the touch points, and a relative angle formed between the touch points;
displaying the set of operating command candidates on a display screen of the flexible display panel, the operating command candidates illustrating how to deform the flexible display device to perform an associated operating command;
receiving an operating command selected from the set of operating command candidates; and
performing the received operating command.

18. The method of claim 17, wherein:
the receiving of the operating command occurs when the flexible display device is deformed in accordance with deformation data associated with the operating command selected from the set of operating command candidates.

19. The method of claim 17, further comprising:
receiving a study mode operating command by the user;
displaying an operating command database on the flexible display device;
displaying an operating command to be modified when touch data corresponding to the operating command is received by the control device; and
determining that a command to modify an input operation of the operating command to be modified is input to update the operating command database when deformation data corresponding to an input operation of the operating command to be modified is repeated a predetermined number of times.

20. The method of claim 17, further comprising:
receiving a user addition menu selecting command;
providing a user profile setting screen;
providing a screen which creates an operating command database per user; and
storing the created operating command database per user.

21. The method of claim 17, further comprising:
when an abnormal input status occurs, releasing the flexible display device from an operating command waiting mode in which the set of operating command candidates is displayed and expressing at least one of a sound, a vibration, flickering, and a warning message display to the user to notify the abnormal input status;
generating a timer to periodically check the status of the flexible display device to determine whether the abnormal input status is released; and
completing the operation when the abnormal input status is released and indicating the abnormal input status again using a sound or display when the abnormal input status is not released.

* * * * *